United States Patent
Lee et al.

(10) Patent No.: US 8,845,864 B2
(45) Date of Patent: Sep. 30, 2014

(54) DIVIDING WALL DISTILLATION COLUMN

(75) Inventors: Sung Kyu Lee, Daejeon (KR); Joon Ho Shin, Daejeon (KR); Jong Ku Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 476 days.

(21) Appl. No.: 13/148,916

(22) PCT Filed: Feb. 12, 2010

(86) PCT No.: PCT/KR2010/000915
§ 371 (c)(1),
(2), (4) Date: Aug. 10, 2011

(87) PCT Pub. No.: WO2010/093203
PCT Pub. Date: Aug. 19, 2010

(65) Prior Publication Data
US 2011/0308930 A1 Dec. 22, 2011

(30) Foreign Application Priority Data

Feb. 12, 2009 (KR) .................. 10-2009-0011311
Feb. 12, 2010 (KR) .................. 10-2010-0013107

(51) Int. Cl.
*B01D 3/14* (2006.01)
*B01D 3/32* (2006.01)
*B01D 3/42* (2006.01)
*C10G 7/00* (2006.01)

(52) U.S. Cl.
CPC *B01D 3/14* (2013.01); *B01D 3/141* (2013.01); *C10G 7/00* (2013.01)
USPC ......... 202/160; 202/158; 196/111; 261/114.5

(58) Field of Classification Search
CPC ............ B01D 3/14; B01D 3/141; B01D 3/42; C10G 7/00
USPC ............ 159/43.1, 44; 202/160, 158; 196/111; 261/114.5
See application file for complete search history.

(56) References Cited

U.S. PATENT DOCUMENTS

| | | | | | |
|---|---|---|---|---|---|
| 3,084,108 | A | * | 4/1963 | Randall | ............. 203/91 |
| 4,582,569 | A | * | 4/1986 | Jenkins | ............ 202/158 |
| 4,591,367 | A | * | 5/1986 | Pek et al. | ............. 55/344 |
| 4,826,574 | A | * | 5/1989 | Gourlia et al. | ......... 202/158 |
| 5,914,012 | A | | 6/1999 | Kaibel et al. | |
| 6,551,465 | B1 | * | 4/2003 | Van Zile et al. | ........ 202/158 |
| 6,762,334 | B1 | * | 7/2004 | Stewart et al. | ......... 585/323 |
| 8,092,655 | B2 | * | 1/2012 | Burst et al. | ............. 203/1 |
| 2006/0082006 | A1 | | 4/2006 | Zone et al. | |
| 2010/0206712 | A1 | * | 8/2010 | Heydrich et al. | ........... 203/5 |

FOREIGN PATENT DOCUMENTS

| | | | |
|---|---|---|---|
| EP | 1084741 | * | 3/2001 |
| JP | 2008-509960 | | 4/2005 |
| JP | 2005-131586 | | 5/2005 |

(Continued)

*Primary Examiner* — Virginia Manoharan
(74) *Attorney, Agent, or Firm* — McKenna Long & Aldridge LLP

(57) ABSTRACT

Provided is a dividing wall distillation column. The dividing wall distillation column includes a main column having a dividing wall. The main column includes a pressure equalization unit for pressure equalization between a preliminary divisional section and a main divisional section which are divided by the dividing wall. The dividing wall distillation column has an effect of enabling easier operations due to the uniform pressure drop between the two divisional sections divided by the dividing wall.

5 Claims, 5 Drawing Sheets

(56) References Cited * cited by examiner

FOREIGN PATENT DOCUMENTS

| KR | 10-0445277 B1 | 11/2004 |
| KR | 10-0672803 | 1/2007 |
| WO | 2006/018302 | 2/2006 |

PRIOR ART

PRIOR ART

DIVIDING WALL DISTILLATION COLUMN

CROSS-REFERENCE TO RELATED APPLICATION

This application is a National Stage Entry of International Application No. PCT/KR2010/000915, filed Feb. 12, 2010, and claims priority to and the benefit of Korean Patent Application Nos. 10-2009-0011311, filed on Feb. 12, 2009, and 10-2010-0013107, filed on Feb. 12, 2010 which are both hereby incorporated by reference in their entirety for all purposes as if fully set forth herein.

BACKGROUND

1. Field of the Invention

The present invention relates to a dividing wall distillation column, and more particularly, to a dividing wall distillation column including a main column having a dividing wall, wherein the main column includes a pressure equalization unit for pressure equalization between a preliminary divisional section and a main divisional section, which are divided by the dividing wall.

2. Discussion of Related Art

In general, various source materials such as crude oil are often present as a mixture of numerous chemicals. Therefore, the source materials themselves are hardly used in industries, but are generally separated into respective compounds, which are used in these industries. A distillation process is representative of chemical processes for separating a mixture.

In general, the distillation process serves to separate the mixture into two components: a high boiling point component and a low boiling point component. Therefore, the distillation columns whose number (n−1) is smaller than the number (n) of components in the mixture to be separated by 1 are used. That is to say, a process for separating a three-component mixture has mainly used a structure in which two distillation columns are continuously operated on the spots of the conventional distillation industries.

A conventional distillation process for separating a three-component mixture is shown in FIG. 1.

The conventional distillation process uses a two-column system in which a lowermost boiling point component (D) is separated in a first column 11, and a middle boiling point component (S) and a high boiling point component (B) are separated in a second column 21. In this case, the middle boiling point (S) component may be generally remixed in a lower section of the first column.

The above-described conventional distillation process can easily control a composition of a product. However, since the middle boiling point component is remixed in the first column, a thermodynamic efficiency in the distillation column is degraded, resulting in unnecessary consumption of energy.

In order to solve these problems, much research on a new distillation structure has been conducted. A representative example of improving a separation efficiency using a thermally coupled structure may be a structure of a Petlyuk distillation column as shown in FIG. 2. The Petlyuk distillation column is arranged in a structure in which a preliminary separator 12 and a main separator 22 are thermally coupled. Therefore, a low boiling point component and a high boiling point component are primarily separated in the preliminary separator, and then flow to a feed plate of the main separator through a column-top portion and a column-bottom portion of the preliminary separator. Thereafter, the low boiling point, middle boiling point, and high boiling point components are separated in the main separator. This structure has high energy efficiency since a distillation curve in the Petlyuk distillation column is similar to an equilibrium distillation curve. However, the design and operation of a process are not easy, and the balance of pressure in the distillation column is particularly difficult to adjust.

In order to solve the problems regarding the Petlyuk distillation column, a dividing wall distillation column (DWC) has been proposed. A thermodynamic aspect of the DWC is similar to that of the Petlyuk distillation column, but a structural aspect is different from that of the Petlyuk distillation column in that a dividing wall is installed in a distillation column to integrate the preliminary separator of the Petlyuk distillation column in the main separator. Such a structure is highly advantageous in that operations are easily performed since the problems regarding the balance between the preliminary separator of the Petlyuk distillation column and the main separator are naturally solved and thus operations are simple, and the investment costs may also be significantly reduced since two types of distillation columns are integrated into one.

SUMMARY OF THE INVENTION

The dividing wall distillation column is desirably configured so that two divisional sections divided by a dividing wall are maintained at a liquid split ratio of 1:1 in an aspect of easy in operation.

Unlike in theory, however, when a distillation column is operated in practice, it is difficult to maintain a liquid split ratio of 1:1. That is to say, when a liquid is fed into an upper portion of the distillation column at the same ratio as described in theory, a total amount of liquid is increased since the fed liquid gathers together with an amount of a feed at a certain section of the preliminary divisional section, whereas a total amount of liquid is decreased since products are drawn from a side stream in a certain section of the main divisional section. In other words, the difference in flow rate between the preliminary divisional section and the main divisional section takes place in a liquid hydraulic aspect, resulting in the difference in pressure drop between an inside of the preliminary divisional section and an inside of the main divisional section.

Accordingly, the operations may not be performed at a desired vapor split ratio, unlike in theory. In this case, a gas flows in a divisional section having a relatively low pressure drop. In order to solve this problem in a hydraulic aspect, a dividing wall may be installed at a lateral portion rather than the center, but its design and installation are difficult.

Therefore, the present invention is directed to providing a dividing wall distillation column capable of facilitating liquid/gas flows to enable easier operations by maintaining the uniform pressure drop between the preliminary divisional section and the main divisional section.

In one aspect, a dividing wall distillation column including a main column having a dividing wall. Here, the main column includes a pressure equalization unit for pressure equalization between a preliminary divisional section and a main divisional section, which are divided by the dividing wall.

Also, the pressure equalization unit may be at least one of a collector tray for regulating pressure drop, and a dividing wall spaced apart from a lowermost plate tray of a column-top zone.

In addition, the collector tray for regulating pressure drop may be provided in at least one of an upper outflow zone and a column-bottom zone, or at least one of the lowermost plate of the upper outflow zone and the uppermost plate of the column-bottom zone.

Additionally, the collector tray for regulating pressure drop may include a nozzle having a size of 10 to 30 mm.

Also, the collector tray for regulating pressure drop may have a rise area in a range of 10 to 30% of a sectional area of the collector tray.

In addition, a spacing of the dividing wall may be in a range of 10 to 90%, and preferably 30 to 60% of a distance between the lowermost plate tray of the column-top zone and a column internal next to the lowermost plate tray.

Additionally, the entire difference in pressure drop between the preliminary divisional section and the main divisional section may be 1 mmHg or less.

Furthermore, a fluid may be uniformly distributed into the preliminary divisional section and the main divisional section.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Hereinafter, exemplary embodiments of the present invention will be described in detail.

The present invention provides a dividing wall distillation column including a main column having a dividing wall. Here, the main column includes a pressure equalization unit for pressure equalization between a preliminary divisional section and a main divisional section, which are divided by the dividing wall.

According to the present invention, the term "pressure equalization" refers to a substantial pressure equalization rather than a pressure equalization which has an exact numerical value. The term "substantial pressure equalization" means that "a difference in pressure between the divisional sections does not affect a process flow," and preferably means that a difference in pressure drop between the divisional sections is 1 mmHg or less.

Figure 1:
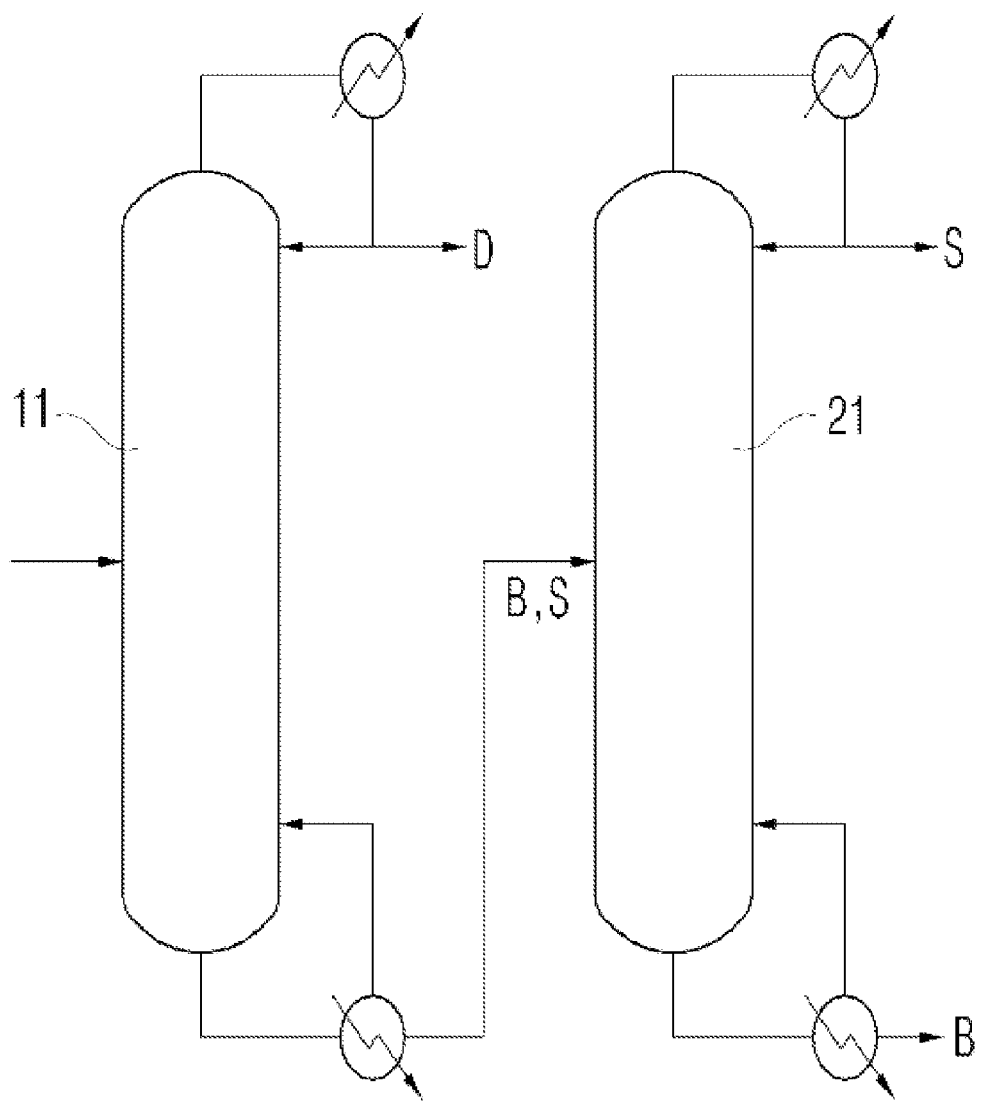
FIG. 1 is a schematic view of a conventional distillation process for separating a three-component mixture.
Figure 2:
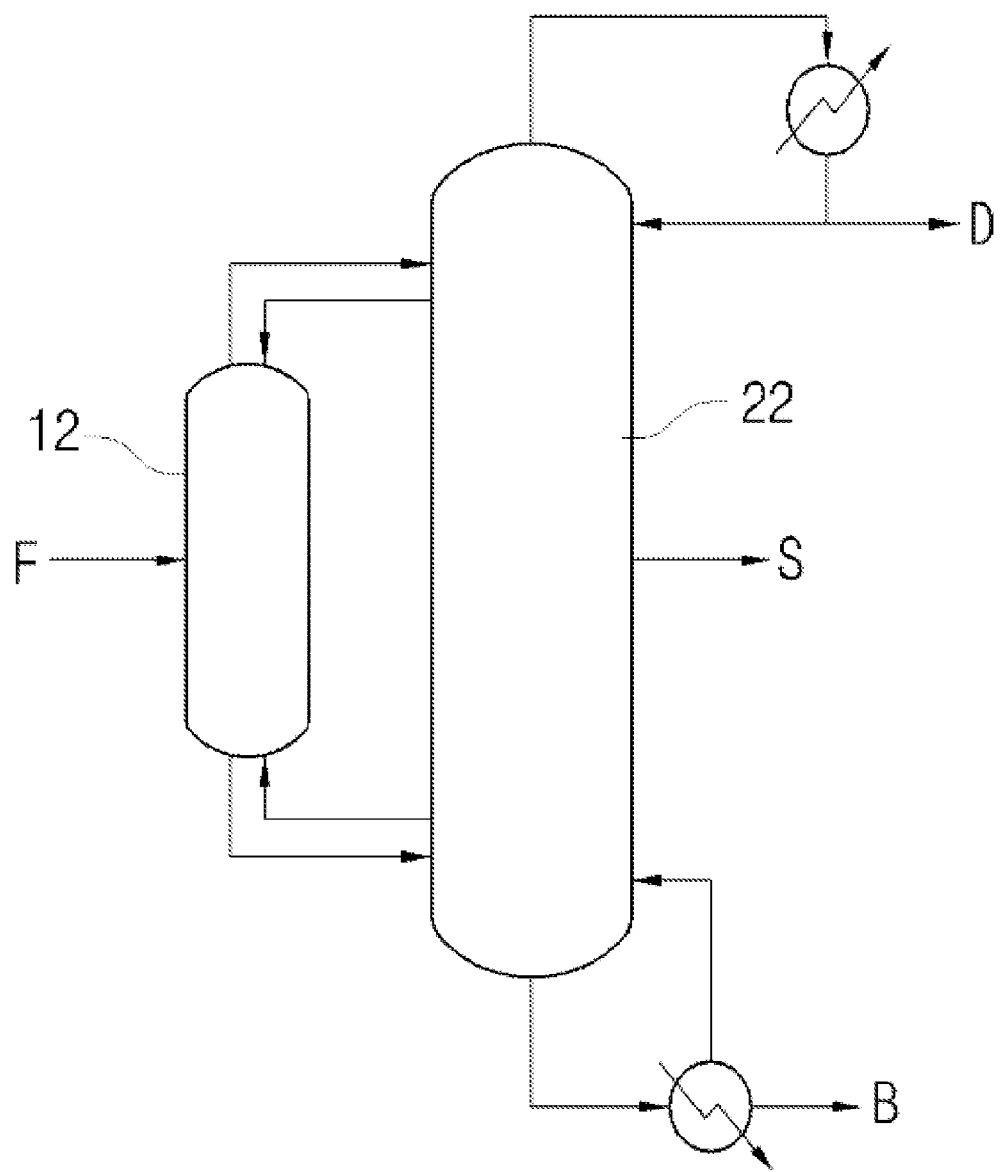
FIG. 2 is a schematic view showing a structure of a Petlyuk distillation column.
Figure 3:
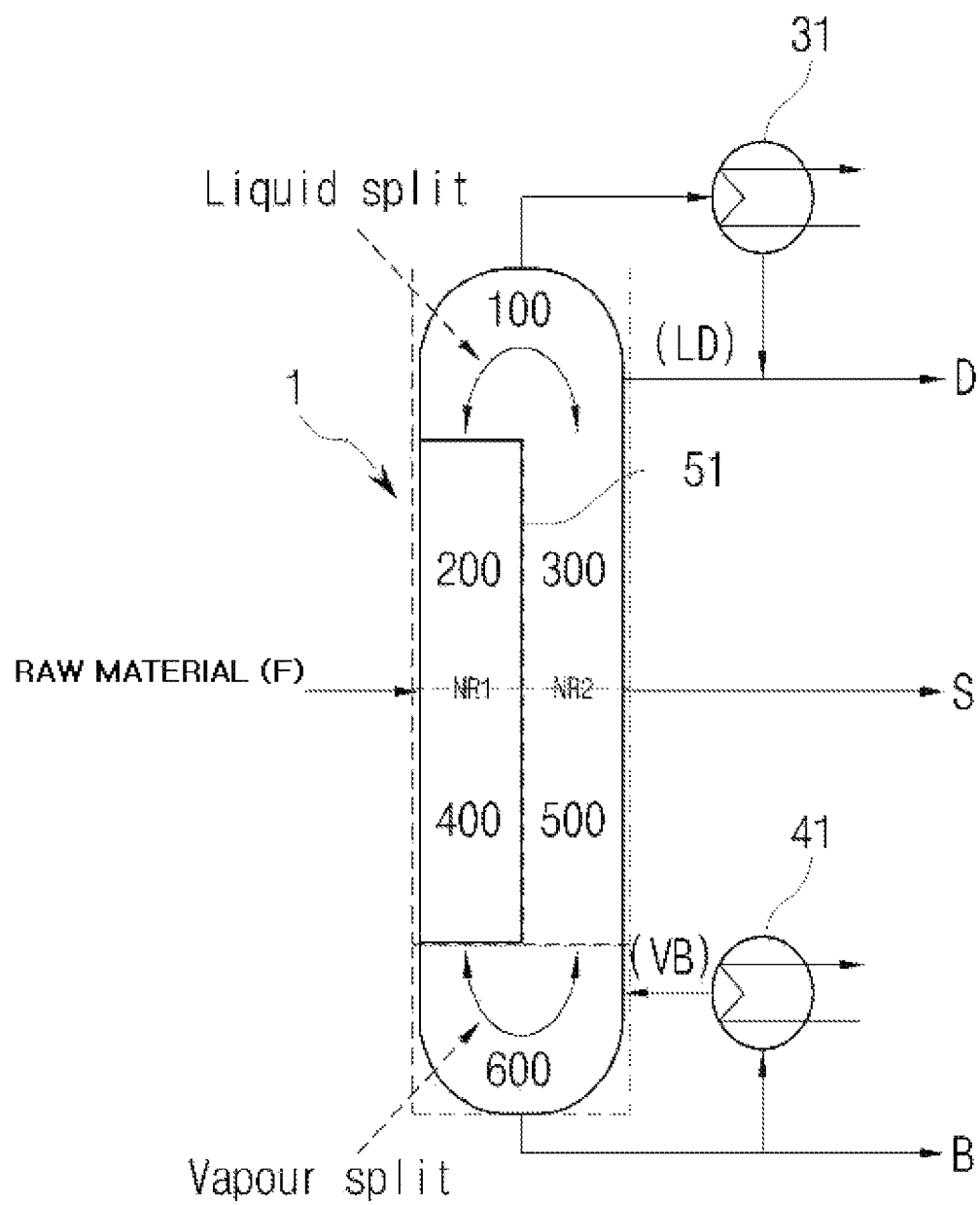
FIG. 3 is a schematic view showing a structure of a dividing wall distillation column according to the present invention.
Figure 5:
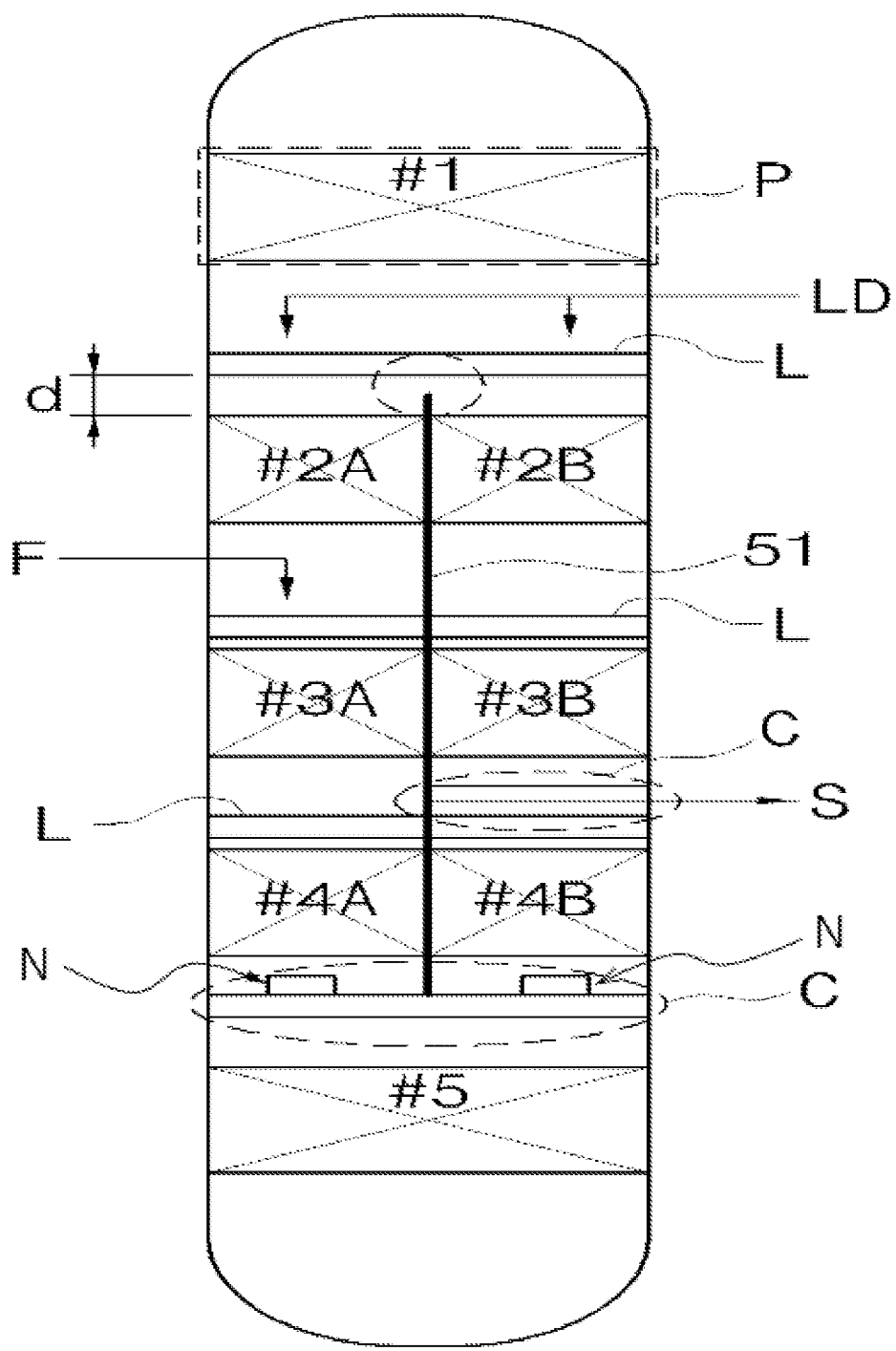
FIG. 5 is a schematic view showing a dividing wall distillation column described in Example 1.

A schematic structure of a dividing wall distillation column according to one embodiment of the present invention is shown in FIG. 3, and a structure of a main column according to one embodiment of the present invention is shown in FIG. 5. Hereinafter, the present invention will be described referring to exemplary embodiments.

The distillation column according to one embodiment of the present invention may include a condenser 31 and/or a reboiler 41 in addition to the main column.

The condenser serves to condense a mixture in a gas state by depriving the mixture of evaporation heat. Here, a condenser used in a conventional chemical engineering system may be used without limitation.

The reboiler serves to vaporize a mixture in a liquid state by providing evaporation heat to the mixture. Here, a reboiler used in a conventional chemical engineering system may be used without limitation.

The main column 1 may be mainly divided into 6 sections.

A column-top zone 100 refers to an upper region of the main column in which a dividing wall is not installed.

An upper feed section 200 is one of regions divided by the dividing wall, and a sub-region arranged above a stream of an inflow material (raw material).

An upper outflow zone 300 is one of regions divided by the dividing wall, and a sub-region arranged above a stream of an outflow material.

A lower feed section 400 is the other one of the regions divided by the dividing wall, and a sub-region arranged under a stream of the inflow material.

A lower outflow zone 500 is the other one of the regions divided by the dividing wall, and a sub-region arranged under a stream of the outflow material.

A column-bottom zone 600 refers to a lower section of the main column which does not have a dividing wall.

Also, the main column may be mainly divided into two regions.

The upper feed section and the lower feed section may generally be referred to as a preliminary divisional section since the upper feed section and the lower feed section play a similar role as the preliminary separator which is operated in a conventional process (a continuous process using a series of two distillation columns).

The upper outflow zone and the lower outflow zone may generally be referred to as a main divisional section since the upper outflow zone and the lower outflow zone function as a main separator which is operated in a conventional process (a continuous process using a series of two distillation columns).

According to one embodiment of the present invention, the main column which may be used herein is a packing column containing a packing substance. The packing column includes a porous plate or a latticed holding tray fixed in a column body, packing beds formed on the porous plate or the latticed holding tray and filled with a packing substance to a suitable height, and a liquid distributor usually arranged between the packing beds. The packing substance is a porous solid having a surface area, and a distillation operation is performed due to a gas-liquid contact in the packing layer. Examples of the packing substance used herein include ceramics, graphite, and metals.

According to one embodiment of the present invention, the pressure equalization unit for substantial pressure equalization between the preliminary divisional section and the main divisional section, which are divided by the dividing wall, may be a collector tray for regulating pressure drop, and/or a dividing wall spaced apart from a lowermost plate tray of the column-top zone.

The collector tray for regulating pressure drop refers to a collector tray which is further provided for the purpose of regulation of the pressure drop (a collector tray is generally a device widely known in the art, which functions to gather a liquid so as to distribute the liquid for the side-draw purpose), in addition to the collector tray used for a constitution of plates calculated by a method of calculating a theoretical plate number of a distillation process (according to the present invention, a conventional method known in the art may be used without limitation as the method of calculating a theoretical plate number of a distillation process).

According to one embodiment of the present invention, the collector tray for regulating pressure drop may be provided in the upper outflow zone. Since a middle outflow plate NR2 is arranged under the upper outflow zone, the upper outflow zone may have a relatively weaker pressure drop than the preliminary divisional section. That is to say, since a small amount of a liquid is present in the middle outflow plate NR2, a level of the pressure drop is lower.

Therefore, an additional collector tray may be installed at this region to cause an additional pressure drop. In particular, the collector tray for regulating pressure drop is provided in a lowermost plate of the upper outflow zone (i.e., immediately above the middle outflow plate NR2), which is preferred in an aspect of prediction and regulation of a level of the pressure drop.

According to one embodiment of the present invention, the collector tray for regulating pressure drop may be provided in the column-bottom zone. As shown in FIG. 3, the material exchange of gas components between the preliminary divisional section and the main divisional section divided by the dividing wall takes place through the column-bottom zone. In this case, the collector tray for regulating pressure drop may be installed at the column-bottom zone to regulate a level of the pressure drop (see FIG. 5). In particular, the collector tray for regulating pressure drop is provided in an uppermost plate of the column-bottom, which is preferred in an aspect of prediction and regulation of a level of the pressure drop.

According to one embodiment of the present invention, the collector tray for regulating pressure drop C may include a nozzle N having a size of 10 to 30 mm. When the size of the nozzle is less than 10 mm, a pressure drop is highly increased with an increase in a flow rate, which makes it difficult to uniformly distribute a liquid fed from the liquid distributor. On the other hand, when the size of the nozzle exceeds 30 mm, a liquid level exceeds a suitable level, which makes it impossible to regulate an overall pressure.

According to one embodiment of the present invention, the collector tray for regulating pressure drop may have a rise area in a range of 10 to 30% of a sectional area of the collector tray. When the sectional area of the collector tray is less than 10%, a pressure drop is highly increased, whereas, when the sectional area of the collector tray exceeds 30%, it is difficult to regulate an overall pressure due to reduction in a pressure drop.

In addition, according to one embodiment of the present invention, the dividing wall is characterized in that it is spaced apart from the lowermost plate tray of the column-top zone. In general, the dividing wall is divided into a main divisional section and a preliminary divisional section which comes in contact with the lowermost plate tray of the column-top zone. In this case, the material exchange between the preliminary divisional section and the main divisional section is not smoothly performed, which is not preferred in an aspect of pressure equalization. Therefore, one embodiment of the present invention aims to promote the pressure equalization by spacing the lowermost plate tray of the column-top zone and the dividing wall.

In particular, according to one embodiment of the present invention, a spacing of the dividing wall may be in a range of 10 to 90% of a distance (d) between the lowermost plate tray of the column-top zone and a column internal next to the lowermost plate tray. Here, the term "lowermost plate tray of a column-top zone" refers to a collector tray, a packing bed, a plate or the like which constitutes a lowermost plate of the column-top zone, and the "column internal next to the lowermost plate tray" refers to a packing bed (in the case of the packing column) or a plate (in the case of a shelf column) arranged immediately below the lowermost plate tray of the column-top zone. For example, in the packing column, the spacing of the dividing wall may be in a range of 10 to 90% of a distance between a lowermost plate of a lowermost packing bed and an uppermost plate of a packing bed arranged immediately below the lowermost plate. When the spacing of the dividing wall is less than 10%, the dividing wall plays a poor role in the pressure equalization, whereas, when the spacing of the dividing wall exceeds 90%, it is difficult to maintain a liquid level, and to control a reflux split fed into the preliminary divisional section and the main divisional section. A more preferred spacing is in a range of 30 to 60%.

The main column has at least one inflow point and at least three outflow points.

A raw material (F) flows in a middle inflow plate NR1 in which the upper feed section and the lower feed section of the main column come in contact with each other, a low boiling point component (D) flows out from the column-top zone, a high boiling point component (B) flows out from the column-bottom zone, and a middle boiling point component (S) flows out in the middle outflow plate NR2 in which the upper outflow zone and the lower outflow zone come in contact with each other.

This dividing wall distillation process has lower energy consumption than a conventional distillation process using two continuous distillation columns, which may be derived from a structural difference. In the dividing wall distillation column, since spaces divided by the dividing wall serve as a preliminary separator, a composition of a liquid substantially correspond to an equilibrium distillation curve due to separation of the high boiling point component and the low boiling point component, and a thermodynamic efficiency for separation is good due to suppression of a remixing effect.

The upper feed section and the lower feed section play a similar role as the preliminary separator which is operated in a conventional process (i.e., the upper feed section and the lower feed section may be generally referred to as a preliminary divisional section). A three-component mixture flowing in the preliminary divisional section is separated into a low boiling point component and a high boiling point component. Some of the low boiling point component and the high boiling point component separated in the preliminary divisional section flows in the column-top zone and the column-bottom zone, and some flows back in the upper outflow zone and the lower outflow zone and is re-distilled.

The upper outflow zone and the lower outflow zone serve as a main separator which is operated in a conventional process (i.e., the upper outflow zone and the lower outflow zone may be generally referred to as a main divisional section). Mainly, the low boiling point component and the middle boiling point component are separated in an upper portion of the dividing wall of the main divisional section, and the middle boiling point component and the high boiling point component are separated in a lower portion of the dividing wall.

The low boiling point component is passed through the column-top zone of the main column and the condenser, and some of the low boiling point component is then produced into a low boiling point product (D), and the rest flows back to the column-top zone of the main column at a liquid flux (LD), and the high boiling point component is passed through the column-bottom zone of the main column and the reboiler, and some of the high boiling point component is then produced into a high boiling point product (B), and the rest flows back to the column-bottom zone of the main column at a vapor flux (VB).

The design of a thermally coupled distillation column system having a dividing wall is based on the design of a conventional thermally coupled distillation column, and the design of a distillation column having a minimum number of plates. The efficiency of the distillation column is maximal when a liquid compositional distribution of distillation plates in the distillation column is similar to an equilibrium distillation curve. Therefore, a minimum-plate distillation system is first designed on the assumption that a distillation column is operated under a pre-reflux handling. That is to say, the upper feed section and the lower feed section are designed on the assumption that a composition of a liquid is identical to that of a raw material in a raw material feed plate. Also, in the upper outflow zone and the lower outflow zone, a liquid composition is calculated from the middle to the column top of the distillation column using a cascade method for designing an equilibrium composition, starting from a concentration of the middle boiling point product. In the lower outflow zone serving as the main separator, a liquid composition is calculated from the middle to the column bottom of the distillation column using a cascade method of calculating an equilibrium composition, starting from a concentration of the middle boiling point product. Then, the plate number of the upper feed section and the lower feed section, which serve as the preliminary separator, and the plate number of the upper outflow zone and lower outflow zone, which serve as the main separator, may be determined from the distribution of the obtained liquid composition, respectively, by counting the number of raw material feed plates and the number of plates having a composition of a product. Here, since the obtained number of the plates in the distillation column is an ideal theoretical plate number, the plate number in the distillation column is preferably in a range of 80 to 145% of the theoretical plate number, depending on the conventional design standard. When the plate number is less than 80% of the calculated theoretical plate number, the low boiling point and high boiling point components are not easily separated in the preliminary divisional section, whereas when the plate number exceeds 145%, an energy-reducing effect is not increased as a region having a minimum reflux ratio, resulting in an increase in investment costs.

Then, a length of the dividing wall installed in the main column is determined according to the number of plates calculated based on the distillation curves of the upper feed section and the lower feed section, or the upper outflow zone and the lower outflow zone.

In such a dividing wall distillation column, there are various method of calculating the theoretical plate number and amount of reflux by determining a spacing of the dividing wall using an equilibrium distillation curve method on a liquid composition with the preliminary divisional section and the main divisional section so as to design an optimal spacing of the dividing wall. However, the Fenske-Underwood equation is used to calculate the theoretical plate number according to the present invention (the Fenske-Underwood equation is widely known to those skilled in the art).

The length of the dividing wall is preferably in a range of 30 to 85% of the total theoretical plate number of the column-top zone, the upper feed section, the lower outflow zone and the column-bottom zone, which are calculated based on the distillation curve. When the length of the dividing wall is less than 30%, some of the low boiling point component flows down from the preliminary divisional section, and may be introduced into a product in the main separator. On the other hand, when the length of the dividing wall exceeds 85%, it is difficult to maintain smooth equilibrium flow of liquid/vapor states of the low boiling point/middle boiling point components and liquid/vapor states of the middle boiling point/high boiling point components in the distillation column, which makes it difficult to manufacture a distillation column.

Hereinafter, the present invention will be described in further detail with reference to the following Examples. It should be understood that the descriptions proposed herein are merely preferable examples for the purpose of illustration only, and not intended to limit the scope of the invention.

EXAMPLE 1

A used packing substance had a specific surface area of 250 $m^2/m^3$ or more and porosity of 0.98 or more, and was made of a metal. A packing column had a height equivalent of a theoretical plate (HETP) of 450 mm or less (a column height is generally calculated as a theoretical plate number and a height equivalent to one theoretical plate). The packing layer was manufactured and installed at a height of 1000 to 7000 mm according to a position and role of the packing layer.

As shown in FIG. 5, collector trays for regulating pressure drop were installed at the lowermost plate of the upper outflow zone and the uppermost plate of the column-bottom zone (a total of two collector trays). The collector tray for regulating pressure drop had a nozzle size of 25 mm and a rise area of 25% with respect to the sectional area. The two collector trays for regulating pressure drop had the same nozzle size and rise area.

Also, the dividing wall was designed so that a spacing of the dividing wall could be 50% of a distance (d) between a lowermost plate tray (collector tray) of the column-top zone and a column internal (packing bed) next to the lowermost plate tray.

EXAMPLE 2

A distillation column was designed and manufactured under the same conditions as in Example 1. However, a collector tray for regulating pressure drop provided in the lowermost plate of the upper outflow zone had a nozzle size of 15 mm and a rise area of 20%, and a collector tray for regulating pressure drop provided in the uppermost plate of the column-bottom zone had a nozzle size of 10 mm and a rise area of 20%.

COMPARATIVE EXAMPLE 1

A used packing substance had a specific surface area of 250 $m^2/m^3$ or more and porosity of 0.98 or more, and was made of a metal. A packing column had an HETP of 450 mm or less (a column height is generally calculated as a theoretical plate number and a height equivalent to one theoretical plate). The packing layer was manufactured and installed at a height of 1000 to 7000 mm according to a position and role of the packing layer.

Figure 4:
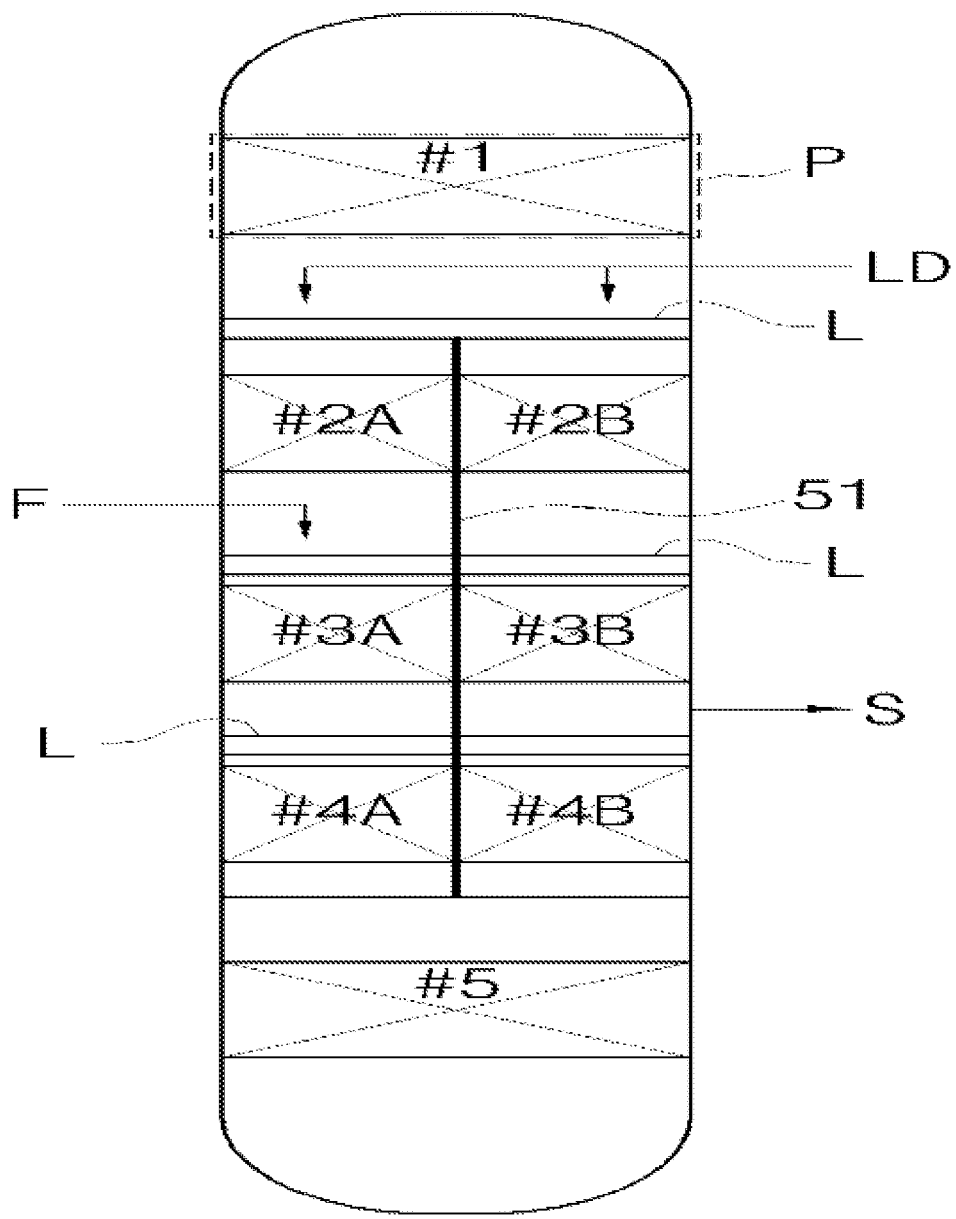
FIG. 4 is a schematic view showing a dividing wall distillation column described in Comparative Example 1.

As shown in FIG. 4, the distillation column of Comparative Example 1 had no additional collector tray for regulating pressure drop, and no dividing wall spaced apart therefrom.

EXPERIMENTAL EXAMPLE 1

Experimental Results on Pressure Drop

In order to verify the performance of the distillation column proposed in the present invention, the distillation columns designed in Examples 1 and 2 and Comparative Example 1 were operated. When an operational state of the distillation column reached a steady state, a level of the pressure drop was measured. The results are listed in the following Table 1.

TABLE 1

| | Comparative Example 1 | | Example 1 | | Example 2 | |
|---|---|---|---|---|---|---|
| | Preliminary divisional section | Main divisional section | Preliminary divisional section | Main divisional section | Preliminary divisional section | Main divisional section |
| Liquid distributor on packing bed #2 | 0.059 | 0.012 | 0.059 | 0.112 | 0.059 | 0.112 |
| Packing bed #2 | 0.159 | 0.525 | 0.159 | 0.525 | 0.159 | 0.525 |
| Liquid distributor on packing bed #3 | 0.142 | 0.115 | 0.142 | 0.115 | 0.142 | 0.115 |
| Packing bed #3 | 3.016 | 2.134 | 3.016 | 2.134 | 3.016 | 2.134 |
| Collector tray for regulating pressure drop | — | — | — | 0.112 | — | 0.569 |
| Liquid distributor on packing bed #4 | 0.179 | 0.114 | 0.179 | 0.114 | 0.179 | 0.114 |
| Packing bed #4 | 0.843 | 0.440 | 0.843 | 0.440 | 0.843 | 0.440 |
| Collector tray for regulating pressure drop | 0.177 | — | 0.177 | 0.112 | 0.177 | 0.566 |
| Total pressure drop | 4.575 | 3.340 | 4.575 | 3.664 | 4.575 | 4.575 |
| Difference in pressure ($\Delta P$) | 1.235 | | 0.911 | | 0 | |

* Pressure unit: mmHg

As listed in Table 1, it was seen from the experimental results that the distillation column according to the present invention has a smaller difference in pressure between the preliminary divisional section and the main divisional section, compared to the distillation column of Comparative Example. From these facts, it was confirmed that the distillation column according to the present invention can be more easily operated, compared to the conventional distillation column.

The dividing wall distillation column according to the present invention has an effect of enabling easier operations due to the uniform pressure drop between the two divisional sections divided by the dividing wall.

While the invention has been shown and described with reference to certain exemplary embodiments thereof, it will be understood by those skilled in the art that various changes in form and details may be made therein without departing from the scope of the invention as defined by the appended claims.

What is claimed is:

1. A dividing wall distillation column comprising a main column having a dividing wall,
   wherein the main column comprises a pressure equalization unit for pressure equalization between a preliminary divisional section and a main divisional section, which are divided by the dividing wall,
   wherein the pressure equalization unit is at least one of a collector tray for regulating pressure drop, and a dividing wall spaced apart from a lowermost plate tray of a column-top-zone,
   wherein the collector tray for regulating pressure drop is provided in at least one of an upper outflow zone and a column-bottom zone, or at least one of a lowermost plate of the upper outflow zone and an uppermost plate of the column-bottom zone,
   wherein a spacing of the dividing wall is in a range of 10 to 90% of a distance between the lowermost plate tray of the column-top zone and a column internal next to the lowermost plate tray, and
   wherein the entire difference in pressure drop between the preliminary divisional section and the main divisional section is 1 mmHg or less.

2. The dividing wall distillation column according to claim 1, wherein the collector tray for regulating pressure drop comprises a nozzle having a size of 10 to 30 mm.

3. The dividing wall distillation column according to claim 1, wherein the collector tray for regulating pressure drop has a rise area in a range of 10 to 30% of a sectional area of the collector tray.

4. The dividing wall distillation column according to claim 1, wherein the spacing of the dividing wall is in a range of 30 to 60% of a distance between the lowermost plate tray of the column-top zone and the column internal next to the lowermost plate tray.

5. The dividing wall distillation column according to claim 1, wherein a fluid is uniformly distributed into the preliminary divisional section and the main divisional section.

* * * * *